Patented May 27, 1941

2,243,097

UNITED STATES PATENT OFFICE 2,243,097

FLUORESCENT SCREEN

Stanley Thomas Henderson, Iver, England, assignor to Electric & Musical Industries Limited, Hayes, Middlesex, England, a company of Great Britain No Drawing. Application January 31, 1939, Serial No. 253,781. In Great Britain February 10, 1938

1 Claim. (Cl. 250—81)

The present invention relates to fluorescent screens, more especially of the kind used in cathode ray tubes.

It is well known that many substances possess the properties of emitting absorbed energy in the form of light, the emission being termed "fluorescence," when bombarded by cathode rays, and the behavior of many fluorescent substances has been studied in detail and their various emission characteristics ascertained. For television purposes an ideal fluorescent screen, when fluorescent, will emit light of such a color that the picture produced on the tube will appear natural; will emit sufficient light to enable proper contrast to be obtained in the received picture, and has the property of resistance to heavy bombardment without deterioration. Moreover, the brightness and color of the fluorescence from the screen should be unaffected by considerable rise in the temperature of the screen; the fluorescence should not tend to become "saturated" except under bombardment by very high intensity cathode rays; the brightness of the fluorescence should be proportional to the current in the cathode ray over a large range; and the emission should die away within a very short interval after the cathode ray has ceased to operate so that the variations of screen brightness will follow closely the intensity variations of the bombarding ray.

In the development of fluorescent screens for use in a cathode ray tube with high screen current and voltage, particularly in projection tubes, the starting point has generally been the well known zinc ortho-silicate or artificial willemite, activated by manganese. This material has the desirable property of resistance to high intensity electron bombardment without deterioration, and, further, the fluorescence obtainable from willemite does not show an appreciable tendency to become saturated till bombarded by high intensity cathode rays, willemite being much superior in this respect to most other fluorescent materials, for example, zinc and zinc-cadmium sulphides, or tungstates. The brightness of the fluorescence from willemite dies away rapidly so that rapid changes of cathode ray intensity are faithfully reproduced by corresponding changes in the fluorescent emission. However, willemite has the objectionable property of emitting light of a green color that is not generally regarded as satisfactory for use in producing a monochrome picture, and, in order to overcome this drawback, attempts have been made to modify the color of the fluorescence emitted by the screen by replacement of part of the zinc by magnesium or beryllium so as to produce greenish-yellow, yellow, orange or red fluorescence.

One object of the present invention is to provide a fluorescent screen for a cathode ray tube which will fluoresce in such a way that the intensity of the fluorescence will vary in accordance with the current in the ray by which the screen is bombarded, and in which the properties of the light emission as regards color may be caused to vary in accordance with the current in the bombarding ray whereby the appearance of a picture reproduced on the screen may be improved.

A further object of the present invention is the provision of a screen capable of very bright fluorescence with good properties in respect of resistance to deterioration under bombardment and emission saturation effects as the beam current is increased and which is largely unaffected by rises in temperature of the support such as the end wall of a discharge tube on which the screen is formed.

According to one feature of the present invention a fluorescent screen adapted to be excited by electron bombardment is provided said screen comprising a mixture of materials the emission from one of said materials being of a distinctive color and varying in quantity with the intensity of the exciting current, and the emission from another of said materials having a distinctive color different from that of the first material and varying in quantity with the intensity of the exciting current in a manner different from that in which the quantity of light emitted from the first material varies, the nature of the materials being such that the color of the light emitted by the screen varies in a desired manner with the intensity of the exciting current. Preferably one of said distinctive colors is yellow and the other blue, the nature of the said materials being such that the color of the fluorescence from the screen becomes more yellow in appearance as the intensity of the exciting current increases and the material of which the fluorescence has a yellow color emits a quantity of light which varies substantially linearly with the intensity of the exciting current within the range of variations thereof whilst the emission of the material of which the fluorescence is blue becomes or tends to become saturated within said range.

In carrying the invention into effect, one constituent of the screen may be zinc beryllium silicate, which may be formed, for example, as described in British Patent Specification No. 478,302 by heating together a mixture of zinc oxide and beryllium oxide and silica in such quantity that the molecular proportions correspond to the orthosilicate. Compounds constituted in this way are found to have a high resistance to deterioration under bombardment and to give only small current saturation effects except under bombardment by cathode rays of very high current intensity, and to emit light of a pronounced yellow color. It is well known that in natural scenes, particularly out of doors and in sun-light, the high lights appear to be yellowish and the shadows appear to be of bluish tint, in strong contrast with the high lights in respect of color as well as in respect of intensity, so that a material giving a yellow fluorescence will, used by itself, normally produce unsatisfactory effects in respect of the shadows in a picture, and will fail to reproduce contrast in a picture with an appearance of naturalness. Now according to the invention, a screen capable of giving a color contrast, is produced by including with the substance giving the yellow emission a component giving a fluorescence which becomes saturated at lower bombarding currents than the yellow fluorescence. For example, if the screen component giving the yellow fluorescence is zinc-beryllium silicate, the component giving the blue fluorescence may be zinc sulphide without an activator, zinc sulphide activated by silver, or calcium tungstate without activator, all of which have a deep blue fluorescence which combines well with the yellow zinc beryllium silicate to give an approximately white fluorescence, provided the mixture of which the screen is formed is correctly constituted. With such a mixture, when the bombarding rays have a high current intensity, the emission from the substance giving the blue fluorescence will tend to saturate and will not increase with increasing current intensity as much in proportion as the fluorescence from the substance giving the yellow fluorescence so that the picture appears to be slightly more yellow in color in the half lights than in the half tones. Moreover, as both the blue and the yellow fluorescence will be unsaturated at low current intensities the shadows will appear to be more blue than the half tones. That is, supposing the two components to be equally efficient in the shadows, as the current intensity of the bombarding ray increases, the efficiency of the component giving the blue fluorescence falls faster than that of the component giving the yellow fluorescence so that the emission from the screen becomes less blue or more yellow.

It is found that a picture produced on a screen having components fluorescing with yellow and blue light respectively as above described may have a pleasing natural appearance, and is suited especially for projection work since the yellow fluorescence only becomes saturated at high current densities so that the high lights are brought out, even when a high current density is required to produce the corresponding emission from the screen.

Preferably, in carrying the invention into practice, the material capable of fluorescing with a yellow light is formed by mixing a mixture of zinc and beryllium oxides with silica in such a way that proportion of metal oxides in the mixture is in excess of that required to form a compound or compounds with all the silica present. For example, willemite (apart from the activator) or zinc ortho-silicate has a chemical formula $2(ZnO).SiO_2$, and it has been proposed in some cases to use in fluorescent screens the meta-silicate $ZnO.SiO_2$, or preparations having compositions intermediate between that of the orthosilicate and the meta-silicate. When the zinc silicate is partly replaced by beryllium or other metals as described in aforesaid Patent Specification No. 478,302 the relation between the proportions of the molecules of metallic oxides and of the molecules of silica in the mixture have been retained so that the amount of silica present has always been in the proportion of one molecule or more for every two molecules of zinc oxide or a mixture of zinc and beryllium or other divalent metallic oxides.

Thus, according to a further feature of the invention a fluorescent screen comprises a mixture including zinc oxide and silica, with or without another divalent metallic oxide such as beryllium oxide, in which the silica is present in such molecular proportion that there is less than one molecule of silica present for every two molecules of the metallic oxides. For example, a silicate composition including between 0.9 and 0.5 molecule of silica for every two molecules of metallic oxides is found to give satisfactory results and there is a mixture in which the molecular proportion of silica to metallic oxide lie within these limits, at about 0.75 molecule, in which zinc-beryllium silicate mixtures show a maximum of fluorescence. The actual proportion of silica to metallic oxide, in the case of a mixture giving the highest fluorescent efficiency depends on the molecular proportions of the oxides to each other. It is believed that no useful purpose is served by including more than two atoms of beryllium to one atom of zinc in the mixture and on the other hand with proportions of beryllium less one atom of five atoms of zinc the mixture is of little value since its fluorescent color approximates to that of willemite. The activator used in the case of zinc-beryllium silicates may be manganese in varying amounts between 0.1 and 2.0% of the weight of the whole. The effect of adding beryllium to the mixture is to change the color of the fluorescence gradually from green to red through yellow in accordance with the proportion of beryllium added. It is desirable to economize in the use of beryllium and since changes in color towards red occur with increase in the proportion of manganese activator, a suitable compromise has been arrived at giving a yellow fluorescence which is not too orange in color on the one hand, and on the other hand not too greenish in tint. This color also has the advantage that it is suitable for mixture with the deep blue fluorescence given, for example, with zinc sulphides with or without silver activator, in order to produce pleasing shades of yellowish white, white or bluish white without its being necessary to add a third component to this mixture as is frequently required.

Zinc-beryllium silicate with a reduced molecular proportion of silica as described above has properties of resistance to heat and bombardment similar to those described for willemite, and it is also nearly as satisfactory as willemite in respect of the saturation of the fluorescence with intensity of the exciting current.

A suitable method of preparing zinc beryllium silicate with a reduced proportion of silica in accordance with the invention is as follows:

Pure beryllium nitrate and pure zinc ammonium nitrate solution are mixed in the proportion of four atoms of beryllium to seven of zinc, and the liquid is made just acid with nitric acid and pure finely divided silica is added in the proportion of one molecule per atom of beryllium. The suspension is stirred, heated to boiling and precipitated by slow addition of excess of saturated ammonium carbonate solution. The whole is evaporated to dryness and heated to dull redness, ground, reheated, reground, treated with the required amount of solution of a manganese salt containing manganese to the extent of 0.6 to 0.9% of the total weight of silicate, dried with a little ammonium carbonate solution and finally activated by heating for an hour at 1200-1300° C. The preparation may also be made by heating an intimate mixture of zinc and beryllium oxides with silica and sufficient manganese salt as activator, but complete combination is not so surely obtained by this method as by that previously described.

A suitable material fluorescing with a blue light for use with a material fluorescing with a yellow light as described above may consist of zinc sulphide activated by silver.

Thus, a satisfactory mixture capable of fluorescing with a substantially high fluorescence may be composed of two to three parts by weight of zinc beryllium silicate and one part of zinc sulphide activated by silver. These materials may be ground together in water and the screen formed by settling in the usual way.

It is not necessary that the high lights of the picture on the screen should be yellowish in order that the color contrast should be apparent. A bluish-white tint in the high lights with deeper blue shadows will still appear to be yellowish white in the high lights owing to the peculiar properties of the eye. The proportions of the mixture may therefore be varied according to the particular effect desired. The degree of color contrast may also be varied by choosing a suitable blue component since the current saturation effect varies for different materials and even for separately prepared batches of the same material. The saturation effect may be measured before the material is used as a component of a mixture so that the resulting color contrast between the high lights and shadows of the received picture may be varied between limits depending only on the ultimate properties of the fluorescent materials.

It is, of course, possible to use other non-saturating materials of yellow fluorescence instead of zinc beryllium silicate in order to produce the effect of naturalness described above, for example, zinc borate may be used activated with manganese, and alternatively the compound of zinc oxide and silica in the proportion of one molecule to two, and activated at low temperatures (800°-900°) with manganese may be used.

Also other materials than those described may be used for giving the blue fluorescence. For example, zinc or cadmium tungstate may be used, though with these substances the paler color of the blue constituent in the screen mixture produces a different resultant tint from the mixtures given above.

Having thus described my invention, what I claim is:

A luminescent screen comprising a mixture of silver activated zinc sulphide and manganese activated zinc borate.

STANLEY THOMAS HENDERSON.